(12) United States Patent
Kahle et al.

(10) Patent No.: US 6,658,555 B1
(45) Date of Patent: Dec. 2, 2003

(54) DETERMINING SUCCESSFUL COMPLETION OF AN INSTRUCTION BY COMPARING THE NUMBER OF PENDING INSTRUCTION CYCLES WITH A NUMBER BASED ON THE NUMBER OF STAGES IN THE PIPELINE

(75) Inventors: James Allan Kahle, Austin, TX (US); Hung Qui Le, Austin, TX (US); Charles Roberts Moore, Austin, TX (US); David James Shippy, Austin, TX (US); Larry Edward Thatcher, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,077

(22) Filed: Nov. 4, 1999

(51) Int. Cl.[7] .................................................. G06F 9/30
(52) U.S. Cl. ....................................... 712/219; 712/244
(58) Field of Search ................................. 712/219, 244

(56) References Cited

U.S. PATENT DOCUMENTS

| | | | | |
|---|---|---|---|---|
| 5,692,169 A | * | 11/1997 | Kathail et al. | 712/244 |
| 5,748,936 A | * | 5/1998 | Karp et al. | 712/244 |
| 5,799,179 A | * | 8/1998 | Ebcioglu et al. | 712/216 |
| 5,881,280 A | * | 3/1999 | Gupta et al. | 712/244 |
| 6,163,839 A | * | 12/2000 | Janik et al. | 712/219 |

OTHER PUBLICATIONS

Chang, Andrew, et al., The Effects of Explicitly Parallel Mechanisms on the Multi–ALU Processor CLuster Pipeline, Feb. 1998, IEE Publication, pp 474–481.*
Popescu et al., "The Metaflow Architecture," 1991, IEEE Micro, pp. 10–13 and 63–73.*
August et al., "Integrated Predicated and Speculative Execution in the IMPACT EPIC Architecture," 1998, The 25th Annual International Symposium on Computer Architecture.*

* cited by examiner

Primary Examiner—Richard L. Ellis
Assistant Examiner—Tonia L. Meonske
(74) Attorney, Agent, or Firm—Joseph P. Lally; Volel Emile; Diana L. Roberts

(57) ABSTRACT

A microprocessor and related method and data processing system are disclosed. The microprocessor includes a dispatch unit suitable for issuing an instruction executable by the microprocessor, an execution pipeline configured to receive the issued instruction, and a pending instruction unit. The pending instruction unit includes a set of pending instruction entries. A copy of the issued instruction is maintained in one of the set of pending instruction entries. The execution pipeline is adapted to record, in response detecting to a condition preventing the instruction from successfully completing one of the stages in the pipeline during a current cycle, an exception status with the copy of the instruction in the pending instruction unit and to advance the instruction to a next stage in the pipeline in the next cycle thereby preventing the condition from stalling the pipeline. Preferably, the dispatch unit, in response to the instruction finishing pipeline execution with an exception status, is adapted to use the copy of the instruction to re-issue the instruction to the execution pipeline in a subsequent cycle. In one embodiment, the dispatch unit is adapted to deallocate the copy of the instruction in the pending instruction unit in response to the instruction successfully completing pipeline execution. The pending instruction unit may detect successful completion of the instruction by detecting when the instruction has been pending for a predetermined number of cycles without recording an exception status. In this embodiment, each entry in the pending instruction unit may include a timer field comprising a set of bits wherein the number of bits in the time field equals the predetermined number of cycles. The pending instruction unit may set, in successive cycles, successive bits in the timer field such that successful completion of an instruction is indicated when a last bit in the time field is set. In one embodiment, pending instruction unit includes a set of copies of instructions corresponding to each of a set of instructions pending in the execution pipeline at any given time. In various embodiments, the execution pipeline may comprise a load/store pipeline, a floating point pipeline, or a fixed point pipeline.

17 Claims, 6 Drawing Sheets

EXAMPLE 1

EXAMPLE 2

EXAMPLE 3

DETERMINING SUCCESSFUL COMPLETION OF AN INSTRUCTION BY COMPARING THE NUMBER OF PENDING INSTRUCTION CYCLES WITH A NUMBER BASED ON THE NUMBER OF STAGES IN THE PIPELINE

BACKGROUND

1. Field of the Present Invention

The present invention generally relates to the field of microprocessors and more particularly to a microprocessor utilizing a non-stalling execution pipeline for improved performance.

2. History of Related Art

The use of pipelined architectures in the design of microprocessor systems is well known. Pipelining improves performance by overlapping the execution of multiple instructions. In a pipelined microprocessor, the execution of each instruction occurs in stages, where each stage ideally completes in one clock cycle. Additional information concerning pipelining is available in Hennessy & Patterson, *Computer Architecture a Quantitative Approach*, pp. 125–214 (Morgan Kaufinann 2d ed. 1996). Turning to FIG. 3, a simplified representation of an execution pipeline 300 in a conventional processor is presented. Pipeline 300 includes a set of latches or registers 302a, 302b, etc. (collectively or generically referred to herein as latches 302). Each latch 302 represents the termination of one pipeline stage and the beginning of another. In FIG. 3, pipeline 300 is full such that each latch 302 contains information corresponding to an instruction that is proceeding through the pipeline. Each stage of pipeline 300 includes a functional logic block, represented in FIG. 3 by reference numerals 304a, 304b, etc., that defines the operation of the corresponding pipeline stage.

If an instruction flowing through a pipeline 300 generates an exception at any stage, the pipeline must be stalled so that instructions in the pipeline do not collide. FIG. 3 indicates a stall condition signal 306 generated by logic block 304a. Stall condition signal 306 indicates that logic block 304a is unable to successfully complete its assigned function with respect to the current instruction (Instruction A) within the single cycle timing constraint. Because Instruction A did not complete successfully, it is necessary to retain Instruction A in latch 302a for at least one more cycle. In addition, it is also necessary to route stall signal 306 to preceding pipeline stages so that instructions corresponding to each of the preceding stages are not advanced in pipeline 300.

In a conventionally designed pipeline such as pipeline 300, an instruction is stalled by feeding the output of each latch 302 back to the latch's input. These feedback loops are indicated in FIG. 3 by reference numerals 308a, 308b, etc. Accordingly, each latch 302 can receive its input from a one of two sources, namely, the output of the preceding stage or the output the latch itself. In a typical configuration, this dual input feature is accommodated using a multiplexer corresponding to each bit of a latch 302 as depicted in FIG. 4. FIG. 4 illustrates the output of a bit 310 of a latch 302 being routed back to one of the inputs of a multiplexer 312k. The other input to multiplexer 312k is received from the output of a preceding stage in pipeline 300. The stall signal 306 serves as the select input to mux 312k. It will be appreciated the structure of FIG. 4 is repeated for each bit position in latch 302 and that the number of multiplexers 310 that stall signal 306 is required to drive increases with the number of bits in latch 302. In addition, stall signal 306 must be routed to preceding stages to stall instructions in preceding latches. This routing may require signal 306 to travel a considerable distance over an interconnect with an associated capacitive loading. The combination of the number of multiplexers 312k being driven by signal 306 and the distance that signal 306 must travel limit the minimum time required for stall signal 306 to stall pipeline 300. For processors with wide pipelines (i.e., 64 bits or more), operating a high frequencies (i.e., frequencies in excess of 1 GHz) stall signal 306 may be unable to successfully halt the pipeline in a single cycle. Therefore, it would be desirable to implement a processor with a wide execution pipeline capable of high speed execution free from the constraints imposed by the need to accommodate pipeline stalls.

SUMMARY OF THE INVENTION

The problem identified above is addressed by a microprocessor and related method and data processing system are disclosed. The microprocessor includes a dispatch unit suitable for issuing an instruction executable by the microprocessor, an execution pipeline configured to receive the issued instruction, and a pending instruction unit. The pending instruction unit includes a set of pending instruction entries. A copy of the issued instruction is maintained in one of the set of pending instruction entries. The execution pipeline is adapted to record, in response detecting to a condition preventing the instruction from successfully completing one of the stages in the pipeline during a current cycle, an exception status with the copy of the instruction in the pending instruction unit and to advance the instruction to a next stage in the pipeline in the next cycle thereby preventing the condition from stalling the pipeline. Preferably, the dispatch unit, in response to the instruction finishing pipeline execution with an exception status, is adapted to use the copy of the instruction to re-issue the instruction to the execution pipeline in a subsequent cycle. In one embodiment, the dispatch unit is adapted to deallocate the copy of the instruction in the pending instruction unit in response to the instruction successfully completing pipeline execution. The pending instruction unit may detect successful completion of the instruction by detecting when the instruction has been pending for a predetermined number of cycles without recording an exception status. In this embodiment, each entry in the pending instruction unit may include a timer field comprising a set of bits wherein the number of bits in the time field equals the predetermined number of cycles. The pending instruction unit may set, in successive cycles, successive bits in the timer field such that successful completion of an instruction is indicated when a last bit in the time field is set. In one embodiment, pending instruction unit includes a set of copies of instructions corresponding to each of a set of instructions pending in the execution pipeline at any given time. In various embodiments, the execution pipeline may comprise a load/store pipeline, a floating point pipeline, or a fixed point pipeline.

BRIEF DESCRIPTION OF THE DRAWINGS

Other objects and advantages of the invention will become apparent upon reading the following detailed description and upon reference to the accompanying drawings in which.

Figure 1:
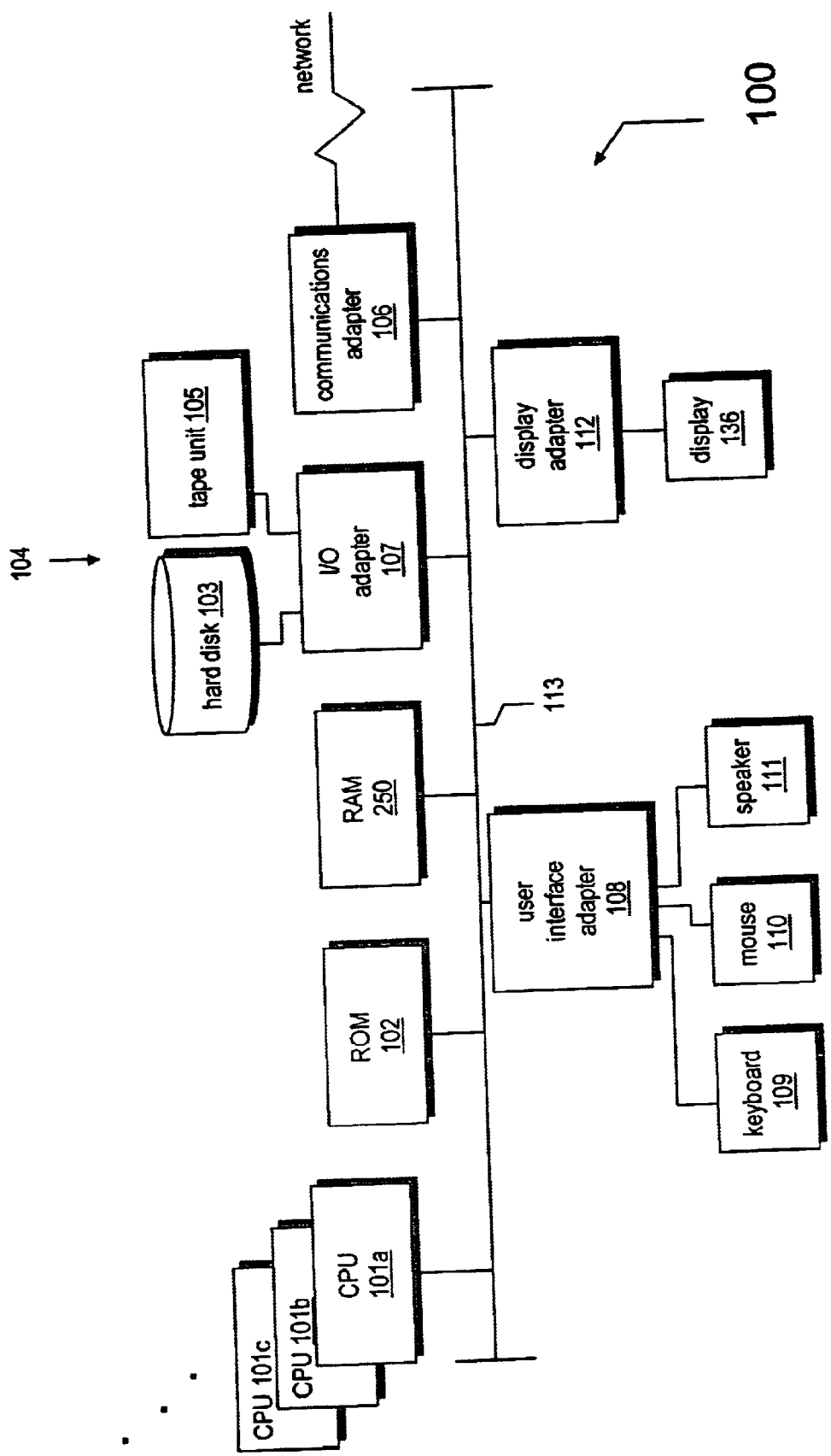
FIG. 1 is a block diagram of a data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Referring now to FIG. 1, an embodiment of a data processing system 100 according to the present invention is depicted. System 100 has one or more central processing units (processors) 101a, 10b, 101c, etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors*, (Morgan Kauftnann, 1994 2d edition). Processors 101 are coupled to system memory 250 and various other components via system bus 113. Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104. A network adapter 106 interconnects bus 113 with an outside network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include the Peripheral Components Interface (PCI) bus according to PCI Local Bus Specification Rev. 2.2 available from the PCI Special Interest Group, Hillsboro Oreg., and incorporated by reference herein. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a SuperI/O chip integrating multiple device adapters into a single integrated circuit. For additional information concerning one such chip, the reader is referred to the PC87338/PC97338 ACPI 1.0 and PC98/99 Compliant SuperI/O data sheet from National Semiconductor Corporation (November 1998) at www.national.com. Thus, as configured in FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation to coordinate the functions of the various components shown in FIG. 1. Additional detail concerning the AIX operating system is available in *AIX Version 4.3 Technical Reference: Base Operating System and Extensions*, Volumes 1 and 2 (order numbers SC23-4159 and SC23-4160); *AIX Version 4.3 System User's Guide: Communications and Networks* (order number SC23-4122); and *AIX Version 4.3 System User's Guide: Operating System and Devices* (order number SC23-4121) from IBM Corporation at www.ibm.com and incorporated by reference herein.

Figure 2:
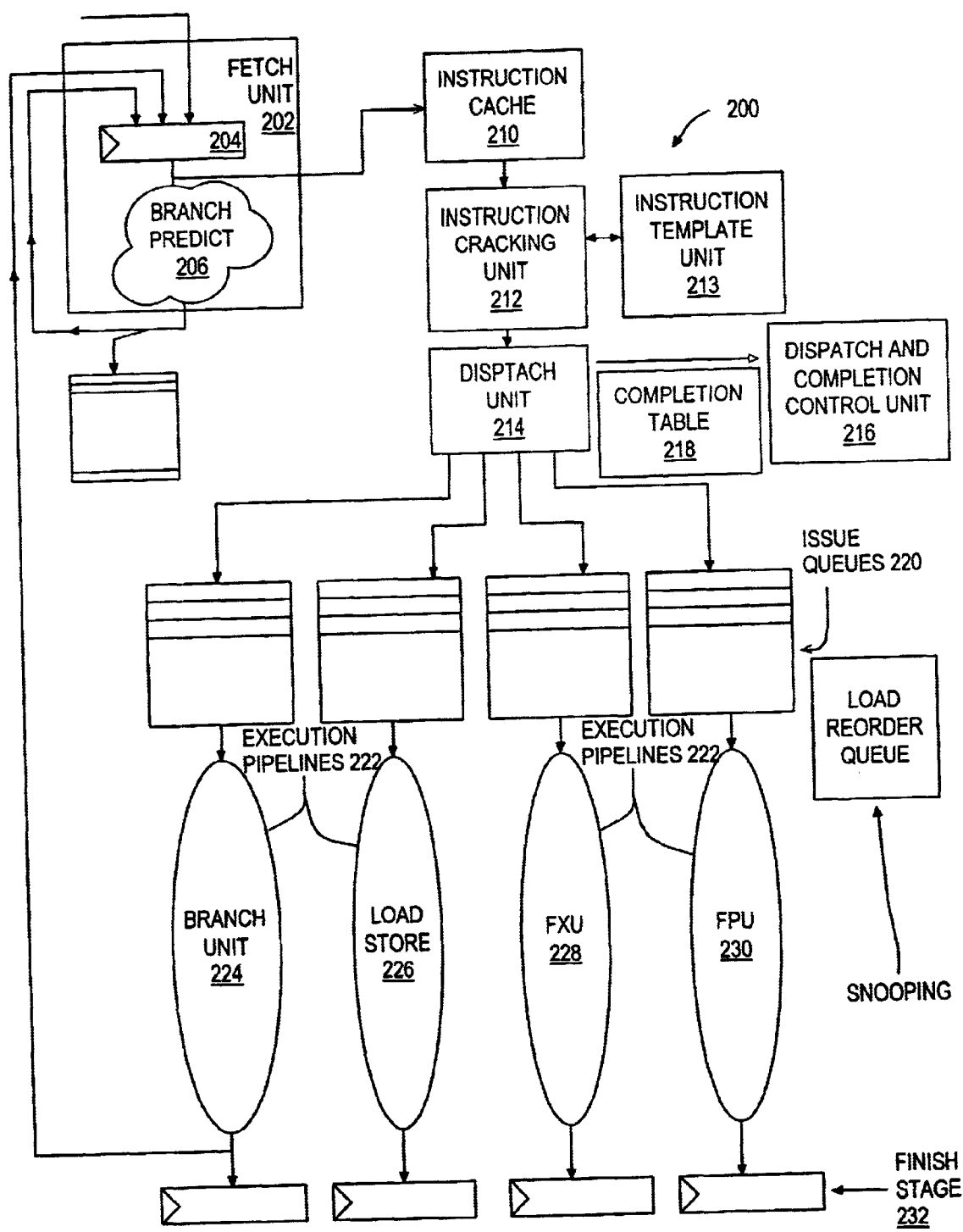
FIG. 2 is a block diagram of a processor for suitable for use in the data processing system of FIG. 1.

Turning now to FIG. 2, a simplified block diagram of a processor 101 according to one embodiment of the present invention is illustrated. Processor 101 as depicted in FIG. 2 includes an instruction fetch unit 202 suitable for generating an address of the next instruction to be fetched. The fetched instruction address generated by fetch unit 202 is loaded into a next instruction address latch 204 and provided to an instruction cache 210. Fetch unit 202 further includes branch prediction logic 206. As its name suggests, branch prediction logic 206 is adapted to make an informed prediction of the outcome of a decision that effects the program execution flow. The ability to correctly predict branch decisions is a significant factor in the overall ability of processor 101 to achieve improved performance by executing instructions speculatively and out-of-order. The address produced by fetch unit 202 is provided to an instruction cache 210, which contains a subset of the contents of system memory in a high speed storage facility. If the address instruction generated by fetch unit 202 corresponds to a system memory location that is currently replicated in instruction cache 210, instruction cache 210 forwards the corresponding instruction to cracking logic 212. If the instruction corresponding to the instruction address generated by fetch unit 202 does not currently reside in instruction cache 210, the contents of instruction cache 210 must be updated with the contents of the appropriate locations in system memory before the instruction can be forwarded to cracking logic 212.

Cracking logic 212 is adapted to modify an incoming instruction stream to produce a set of instructions optimized for executing in an underlying execution pipeline at extremely high operating frequencies (i.e., operating frequencies exceeding 1 GHz). In one embodiment, for example, cracking logic 212 receives instructions in a 32-bit wide format such as the instruction set supported by the PowerPC® microprocessor. Detailed information regarding the PowerPC® instruction set is available in the *PowerPC 620 RISC Microprocessor User's Manual* available from Motorola, Inc. (Order No. MPC620UM/AD), which is incorporated by reference herein. In one embodiment, the format of the instructions generated by cracking logic 212 include explicit fields for information that is merely implied in the format of the fetched instructions such that the format of instructions generated by cracking logic 212 is wider than the format of instructions. In one embodiment, for example, the fetched instructions are encoded according to a 32-bit instruction format and the format of instructions generated by cracking logic 212 is 64 or more bits wide. Cracking logic 212 is designed to generate these wide instructions according to a predefined set of cracking rules. The wide instructions generated by cracking logic 212 facilitate high speed execution by including explicit references to instruction operands.

Figure 5:
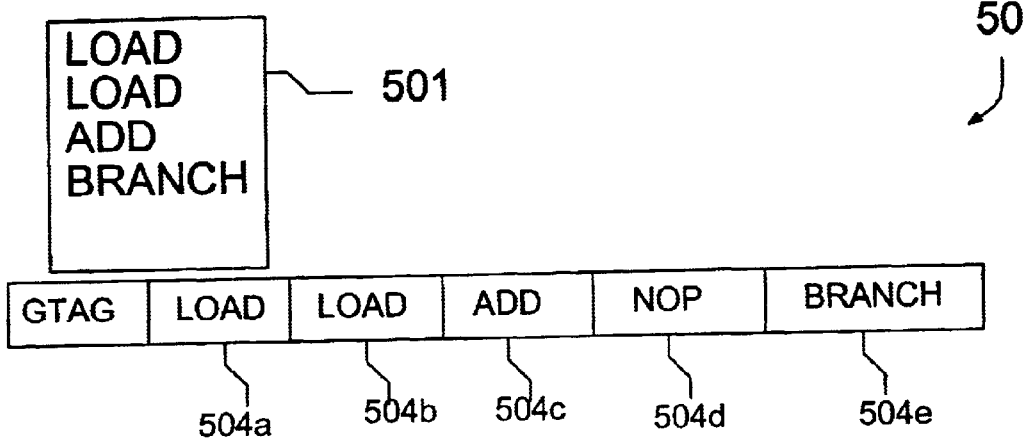
FIG. 5 illustrates operation of the processor of FIG. 2 according to one embodiment of the invention.
Figure 5:
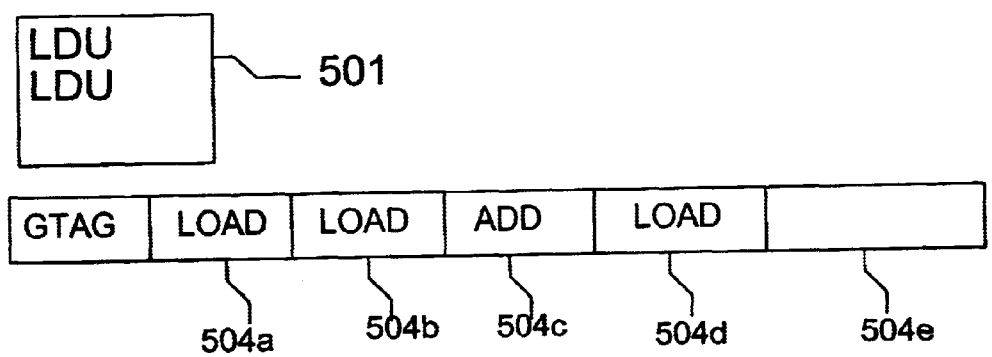
Figure 5:
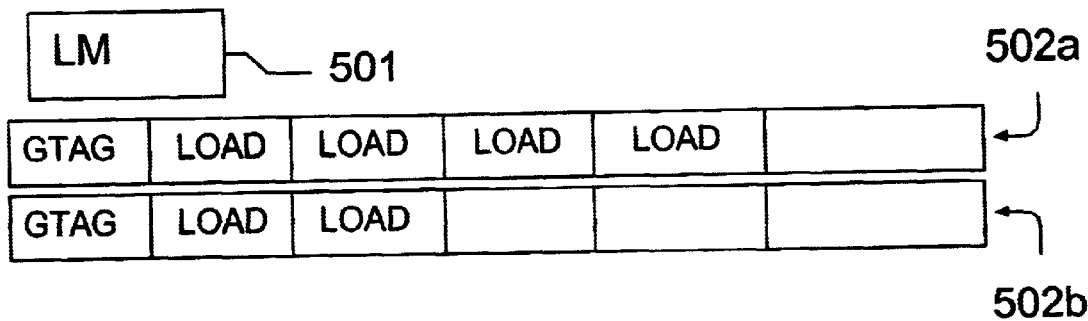

In one embodiment, cracking logic 212 as contemplated herein is designed to organize a set of fetched instructions into instruction "groups" 502, examples of which are depicted in FIG. 5. Each instruction group 502 includes a set of instruction slots 504a, 504b, etc. (collectively or generically referred to as instruction slots 504). The organization of a set of instructions into instruction groups facilitates high speed execution by, among other things, simplifying the logic needed to maintain completion tables for a large number of in-flight instructions. In FIG. 5, three examples of instruction grouping that may be performed by cracking logic 212 are depicted.

In Example 1, a set of instructions indicated by reference numeral 501 is transformed into a single instruction group 502 by cracking logic 212. In the depicted embodiment of the invention, each instruction group 502 includes five slots indicated by reference numerals 504a, 504b, 504c, 504d, and 504e. Each slot 504 may contain a single instruction. In this embodiment, each instruction group may include a maximum of five instructions. The use of instruction groups simplifies renaming recovery and completion table logic by reducing the number of instructions that must be individually tagged and tracked. The use of instruction groups thus contemplates sacrificing some information about each instruction in an effort to simplify the process of tracking pending instructions in an out-of-order processor.

A second example of grouping preformed by cracking logic 212 according to one embodiment of the invention is shown in Example 2 of FIG. 5. This example demonstrates the capability of cracking logic 212 to break down complex instructions into a group of simple instructions for higher speed execution. In the depicted example, a sequence of two load-with-update (LDU) instructions are broken down into an instruction group including a pair of load instructions in slots 504a and 504c respectively and a, pair of ADD instructions in slots 504b and 504d respectively. In this example, because group 502 does not contain a branch instruction, the last slot 504e of instruction group 502 contains no instruction. The PowerPC® load-with-update instruction, like analogous instructions in other instruction sets, is a complex instruction in that the instruction affects the contents of multiple general purpose registers (GPRs). Specifically, the load-with-update instruction can be broken down into a load instruction that affects the contents of a first GPR and an ADD instruction that affects the contents of a second GPR. Thus, in instruction group 502 of example two in FIG. 5, instructions in two or more instruction slots 504 correspond to a single instruction received by cracking unit 212.

In Example 3, a single instruction entering cracking unit 212 is broken down into a set of instructions occupying multiple groups 502. More specifically, Example 3 illustrates a load multiple (LM) instruction. The load multiple instruction (according to the PowerPC® instruction set) loads the contents of consecutive locations in memory into consecutively numbered GPRs. In the depicted example, a load multiple of six consecutive memory locations breaks down into six load instructions. Be cause each group 502 according to the depicted embodiment of processor 101 includes, at most, five instructions, and because the fifth slot 504e is reserved for branch instructions, a load multiple of six registers breaks down into two groups 502a and 502b respectively. Four of the load instructions are stored in the first group 502a while the remaining two load instructions are stored in the second group 502b. Thus, in Example 3, a single instruction is broken down into a set of instructions that span multiple instruction groups 502.

Returning now to FIG. 2, the wide instructions generated in the preferred embodiment of cracking unit 212 are forwarded to dispatch unit 214. Dispatch unit 214 is responsible for determining which instructions are capable of being executed and forwarding these executable instructions to issue queues 220. In addition, dispatch unit 214 communicates with dispatch and completion control logic 216 to keep track of the order in which instructions were issued and the completion status of these instructions to facilitate out-of-order execution. In the embodiment of processor 101 in which cracking unit 212 organizes incoming instructions into instruction groups as discussed above, each instruction group 502 is assigned a group tag (GTAG) by completion and control logic 216 that conveys the ordering of the issued instruction groups. As an example, dispatch unit 214 may assign monotonically increasing values to consecutive instruction groups. With this arrangement, instruction groups with lower GTAG values are known to have issued prior to (i.e., are younger than) instruction groups with larger GTAG values. In association with dispatch and completion control logic 216, a completion table 218 is utilized in one embodiment of the present invention to track the status of issued instruction groups.

In the embodiment of processor 101 depicted in FIG. 2, instructions are issued from dispatch unit 214 to issue queues 220 where they await execution in corresponding execution pipes 222. Processor 101 may include a variety of types of executions pipes, each designed to execute a subset of the processor's instruction set. In one embodiment, execution pipes 222 may include a branch unit pipeline 224, a load store pipeline 226, a fixed point arithmetic unit 228, and a floating point unit 230. Each execution pipe 222 may comprise two or more pipeline stages. Instructions stored in issue queues 220 may be issued to execution pipes 222 using any of a variety of issue priority algorithms. In one embodiment, for example, the oldest pending instruction in an issue queue 220 is the next instruction issued to execution pipes 222. In this embodiment, the GTAG values assigned by dispatch unit 214 are utilized to determine the relative age of instructions pending in the issue queues 220. Prior to issue, the destination register operand of the instruction is assigned to an available rename GPR. When an instruction is ultimately forwarded from issue queues 120 to the appropriate execution pipe, the execution pipe performs the appropriate operation as indicated by the instruction's opcode and writes the instruction's result to the instruction's rename GPR by the time the instruction reaches a finish stage (indicated by reference numeral 232) of the pipeline. A mapping is maintained between the rename GPRs and their corresponding architected registers. When all instructions in an instruction group (and all instructions in younger instruction groups) finish without generating an exception, a completion pointer in the completion table 218 is incremented to the next instruction group. When the completion pointer is incremented to a new instruction group, the rename registers associated with the instructions in the old instruction group are released thereby committing the results of the instructions in the old instruction group. If one or more instructions older than a finished (but not yet committed) instruction generates an exception, the instruction generating the exception and all younger instructions are flushed and a rename recovery routine is invoked to return the GPR mapping to the last known valid state.

Figure 6:
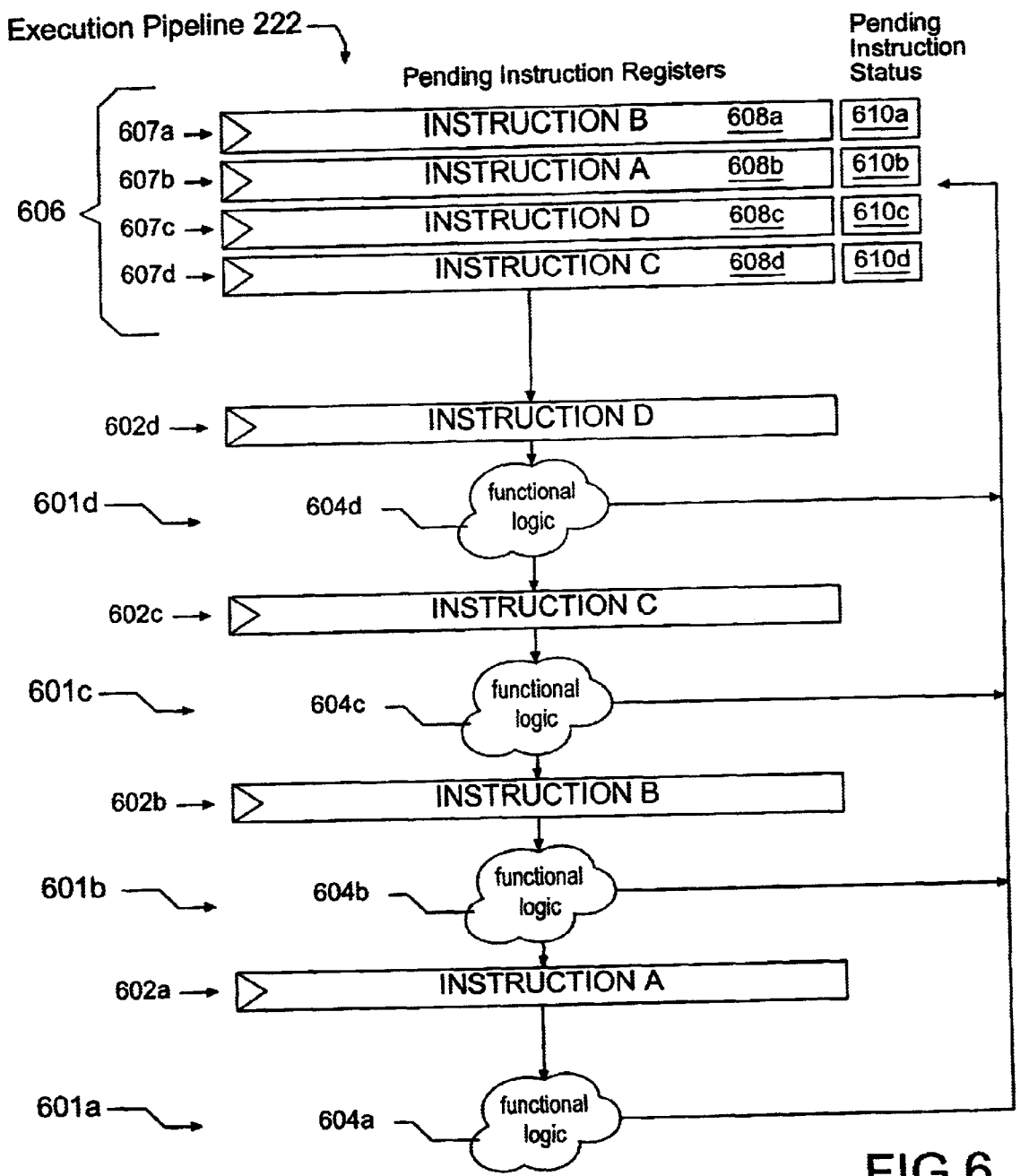
FIG. 6 depicts one embodiment of an execution pipeline of the processor of FIG. 2.

Turning now to FIG. 6, a simplified representation of an execution pipeline 222 suitable for use in processor 101 of FIG. 2 is presented. In the depicted embodiment, execution pipeline 222 includes a set of pipeline stages 601a, 601b, etc. (generically or collectively referred to as stage(s) 601), where each stage 601 comprises a corresponding latch or register 602 and functional logic block 604 that defines the operation that occurs in the stage. Functional logic blocks 604 may include, as examples, adders, loaders, register file writeback circuitry, or any other circuitry necessary to implement the corresponding pipeline.

Execution pipeline 222 further includes a pending instruction unit 606 that includes a set of pending instruction entries 607a, 607b, etc. (pending instruction(s) 607). Each pending instruction entry 607 includes a corresponding pending instruction register 608 and a pending instruction status field 610. In the preferred embodiment, each pending instruction register 608 contains a copy of one of the instructions pending in the stages 601 of execution pipeline 222. In the depicted embodiment, for example, a first pending instruction register 608a is shown as containing a copy of the instruction pending in execution latch 602b (Instruction B) while a second pending instruction register 608b contains a copy of the instruction in execution latch 602a (Instruction A) and so forth. In this manner, pending instruction unit 606 includes a copy of each instruction pending in a pipeline stage 601 of execution pipeline 222. In one embodiment, the pending instruction entries 607 and status fields 610 may be incorporated into issue queues 220 of processor 101.

If a condition exists that prevents an instruction from successfully completing a stage 601 (e.g., stage 601c) in pipeline 222, the condition is noted in the appropriate entry 607 of pending instruction unit 606 and the instruction is advanced in pipeline 222 to the next stage (i.e., stage 601b). If, for example, an instruction generates an exception in one of the functional logic blocks 604 of pipeline 222, the exception condition is forwarded to pending instruction unit 606. Upon detecting the exception condition, the exception condition is recorded in the pending instruction status field 610 of the appropriate entry 607 that corresponds to the instruction that generated the exception. If, for example, Instruction B generates an exception in functional logic block 604b, the exception is routed to pending instruction unit 606. Pending instruction unit 606 determines that the exception corresponds to the copy of the instruction in the first entry 607a and records the exception condition in pending instruction status field 610a. In this manner, pending instruction status field 610a will indicate that Instruction B did not complete successfully. In the clock cycle following the clock cycle in which Instruction B generated the exception, each of the instructions is advanced to the next pipeline stage such that pipeline 222 is not stalled by the inability of Instruction B to successfully complete execution in stage 601b. During some later cycle following the (unsuccessful) completion of Instruction B, the copy of Instruction B stored in first entry 607a of pending instruction unit 606 is used to resubmit Instruction B to execution pipeline 222. The copy of an instruction is maintained in pending instruction unit 606 until the instruction successfully finishes execution in pipeline 222.

In the depicted example, in which pipeline stage 601a represents the final stage of pipeline 222, Instruction A will finish execution in pipeline 222 in the next cycle. If Instruction A did not generate an exception while executing in pipeline 222, and the corresponding entry 607 (i.e., entry 607b) in pending instruction unit 606 is deallocated such as by clearing a bit in pending instruction status field 610b to indicate that entry 607b of pending instruction unit 606 has been deallocated and is available for receiving a subsequent instruction (e.g., Instruction E).

Figure 3:
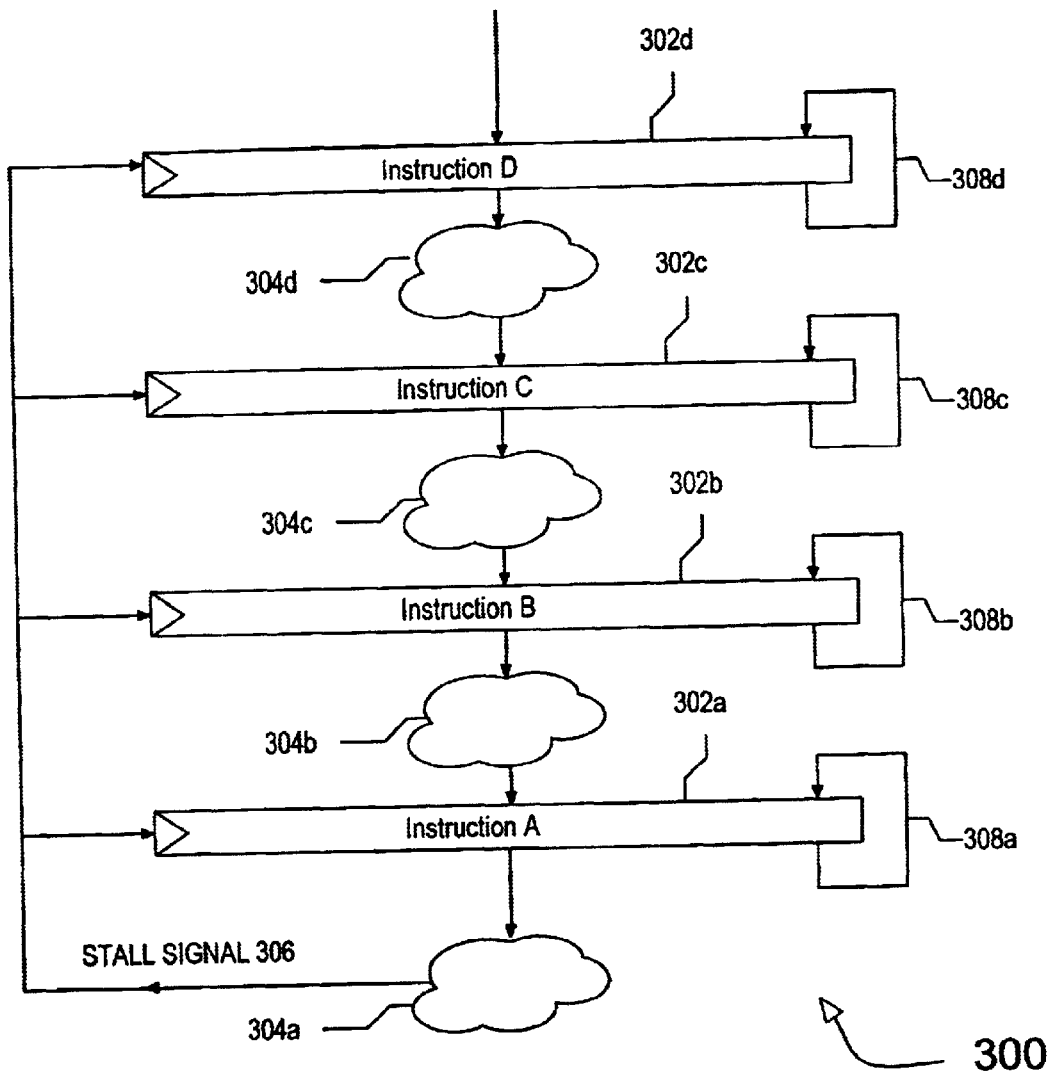
FIG. 3 is a representation of an execution pipeline according to the prior art.
Figure 4:
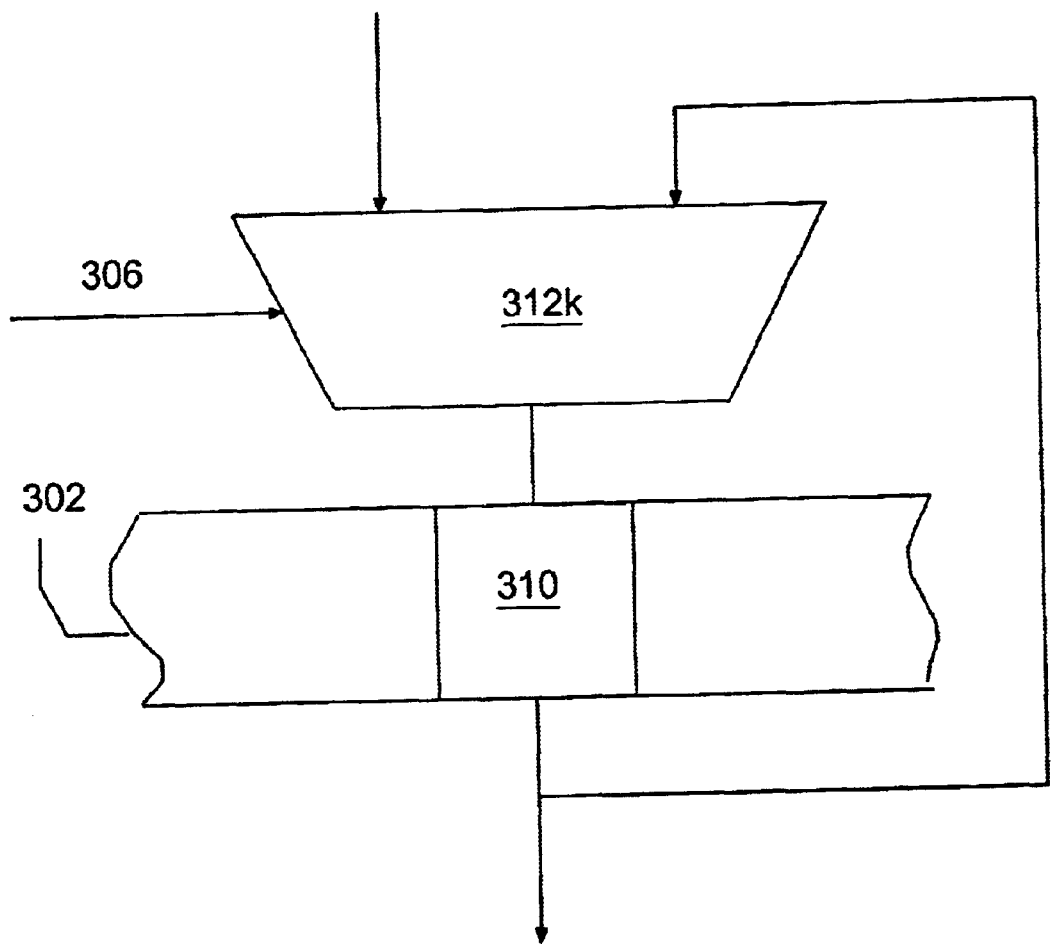
FIG. 4 is a circuit diagram illustrating greater detail of the execution pipeline of FIG. 3.

By maintaining copies of each pending instruction in pending instruction units 606, execution pipeline 222 is able to unconditionally forward instructions to the next successive pipeline stage in each clock cycle. By enabling this unconditional forward progress, execution pipeline 222 contemplates a non-stalling or non-interlocked execution pipeline in which the feedback loops 308 (shown in FIG. 3) needed in traditional processor pipelines to stall instructions in a pipeline stage when an instruction takes an exception are eliminated. In other words, the stages 601 of non-interlocked pipeline 222 of the present invention receive their inputs from a single source, namely, the functional logic block 604 of the preceding stage in contrast to the conventional pipeline of FIG. 3 in which the input to a latch 302 may come from either the output of the preceding stage or from the output of latch 302 itself. The elimination of feedback loops 308 from pipeline 222 eliminates the need for the multiplexing circuitry 312 of FIGS. 3 and 4 and the corresponding stall signal 306 that is required to travel long distances and drive a large number of gates. Because the capacitive loading associated with stall signal 306 constrains the minimum cycle time at which the conventional pipeline 300 may be executed, its elimination beneficially enables faster cycle times for pipeline 222. The invention contemplates that any of the execution pipes 222 in FIG. 2 may be implemented in the manner depicted in FIG. 6 to achieve a non-stalling pipeline. Thus, execution pipeline 222 may comprise, in various embodiments, load store execution unit 226, fixed point execution unit 228, floating point execution unit 230, branch unit 224, or any other suitable execution pipeline.

Figure 7:
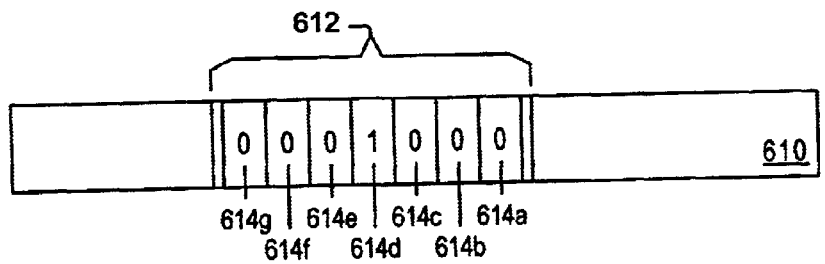
FIG. 7 depicts an embodiment of a timer field in the a pending instruction status register of the pipeline of FIG. 6.

In one embodiment, pending instruction field 610 includes a valid timer field 612. Valid timer field 612 includes a set of valid timer bits 614a through 614g. The number of valid timer bits 614 and valid timer field 612 is implementation specific and is intended to reflect the maximum number of clock cycles that an instruction will require to successfully propagate through execution pipeline 222. In the embodiment depicted in FIG. 6, in which pending instruction unit 606 includes four entries 607a through 607d and execution pipeline 222 includes four pipeline stages 601a, it will be appreciated that an instruction should await forwarding to first stage 601a of execution pipeline 222 no more than three cycles. In addition, once forwarded to first stage 601, each instruction will complete in four clock cycles due to the non-stalling nature of execution pipeline 222. Thus, an instruction that has been residing in pending instruction unit 606 for then seven cycles without generating an exception has presumably completed without exception. Pending instruction status field 610 as depicted in FIG. 7 utilizes this assumption by incorporating a seven bit field. In each cycle, one of the valid timer bits 614a through 614g is set while all remaining valid timer bit are reset. The bit that is set propagates through valid timer field 612 in a manner such that the valid timer bit 614 that is set in any given cycle indicates the number of cycles that the instruction has been pending in pending instruction unit 606 without an exception. In this manner, the valid timer bit 614 that is set "walks" through valid timer field 612. If the set bit walks all the way through valid timer field 612 and makes it to the final timer bit 612g, the instruction is presumed to have completed successfully and is deallocated from pending instruction unit 606. If, on the other hand, during execution in pipeline 222, an instruction generates an exception that is returned to pending instruction unit 606, the valid timer bits 614 and valid timer field 612 are cleared and the initial valid timer bit 614 is set to restart the timing process.

It will be apparent to those skilled in the art having the benefit of this disclosure that the present invention contemplates improved microprocessor performance by implementing an execution pipeline that prohibits stalls and includes necessary facilities for recovering when an instruction pending in the pipeline generates an exception condition. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of executing instructions in a microprocessor, comprising:

issuing an instruction for execution in a multi-sage execution pipeline; and responsive to the instruction generating an exception, recording an exception status associated with the instruction and advancing the instruction to a next stage in the pipeline in the next cycle regardless of whether the instruction is executing speculatively or non-speculatively thereby preventing the instruction from stalling in the pipeline; and determining successful completion of the instruction by counting the number of cycles that the instruction has been pending and comparing the number of cycles the instruction has been pending to a predetermined number determined, at least in part, by the number of stages in the pipeline.

2. The method of claim 1, further comprising maintaining a copy of the instruction while the instruction is executing in the pipeline and recording the exception status with the copy of the instruction.

3. The method of claim 2, further comprising, responsive to the instruction finishing pipeline execution with an exception status, using the copy of the instruction to re-issue the instruction to the execution pipeline in a subsequent cycle.

4. The method of claim 2, wherein maintaining a copy of the instruction is further characterized as storing a copy of the instruction in an entry of a pending instruction unit, wherein each entry in the pending instruction unit includes a pending instruction register suitable for storing the copy of the instruction and a pending instruction status field suitable for indicating an exception status of the instruction.

5. The method of claim 1, wherein comparing the number of cycles is further characterized as comparing the number of cycles the instruction has been pending to a predetermined number determined by the number of stages in the pipeline plus the number of entries in the pending instruction unit.

6. The method of claim 5, wherein tracking the number of cycles comprises walking a single asserted bit through a timer field associated with the instruction, wherein the width of the timer field is at least as great as the sum of the number of stages in the pipeline and the number of entries in the pending instruction unit.

7. A non-interlocked execution pipeline within a microprocessor, the pipeline comprising a set of pipeline stages, each pipeline stage defined by a latch and a corresponding functional logic block, wherein each stage in the pipeline receives its inputs exclusively from the functional logic block of the preceding stage and wherein the pipeline is configured to determine successful completion of the instruction by tracking the number of cycles that the instruction has been pending and comparing the number of cycles the instruction has been pending to a predetermined number determined, at leas in part, by the number of stages in the pipeline.

8. The pipeline of claim 7, further comprising a pending instruction register suitable for storing a copy of the instruction while the instruction is executing and a corresponding pending instruction status field suitable for storing an exception status of the instruction as it executes.

9. The pipeline of claim 8, wherein the pipeline is configured to maintain the copy of the instruction in the pending instruction register until the instruction completes and further configured to use the copy of the instruction to re-issue the instruction to the execution pipeline in a subsequent cycle if the status field indicates an exception condition when the instruction reaches a finish stage in the pipeline.

10. The pipeline of claim 9, wherein the pending instruction register and corresponding pending instruction status field comprise an entry of a pending instruction unit, each entry in the pending instruction unit including a corresponding pending instruction register and pending instruction status field, wherein the number of entries in the pending instruction unit reflects the number of stages in the execution pipeline.

11. The pipeline of claim 9, wherein the predetermined number is determined by the number of stages in the pipeline plus the number of entries in the pending instruction unit.

12. The pipeline of claim 11, further comprising a timer field corresponding to each pending instruction, the bit width of the timer field indicative of the predetermined number, wherein the pipeline is configured to track the number of cycles an instruction has been pending by walking a single asserted bit through the corresponding timer field.

13. A microprocessor comprising:

a non-stall execution pipeline comprising a set of pipeline stages, each pipeline stage defined by a latch and a corresponding functional logic block, and wherein each latch's inputs during a next clock cycle are independent of the latch's outputs from the current clock cycle; and a pending instruction unit comprising a set of pending instruction entries, each pending instruction entry corresponding to an instruction pending in the execution unit, each entry comprising an pending instruction register unit suitable for storing a copy of the instruction and a pending instruction status field suitable for recording an exception status associated with the instruction; and wherein the pipeline is configured to determine successful completion of the instruction by tracking the number of cycles that the instruction has been pending and comparing the number of cycles the instruction has been pending to a predetermined number determined at least in party, by the number of stages in the pipeline.

14. The pipeline of claim 13, further comprising means for recording an exception status of an instruction in the corresponding status field and means for re-issuing the instruction to the execution pipeline in a subsequent cycle if the status field indicates an exception condition when the instruction reaches finish stage in the pipeline.

15. The pipeline of claim 14, wherein the wherein the number of entries in the pending instruction unit equals the number of stages in the execution pipeline.

16. The pipeline of claim 13, wherein the predetermined number is determined by the number of stages in the pipeline plus the number of entries in the pending instruction unit.

17. The pipeline of claim 16, further comprising a timer field corresponding to each pending instruction, the bit width of the timer field indicative of the predetermined number, wherein the pipeline is configured to track the number of cycles an instruction has been pending by walking a single asserted bit through the corresponding timer field.

* * * * *